Feb. 2, 1937. G. A. GRAHAM 2,069,242
ELECTROACOUSTIC ENERGY CONVERTING SYSTEM
Filed Jan. 19, 1933 3 Sheets-Sheet 1
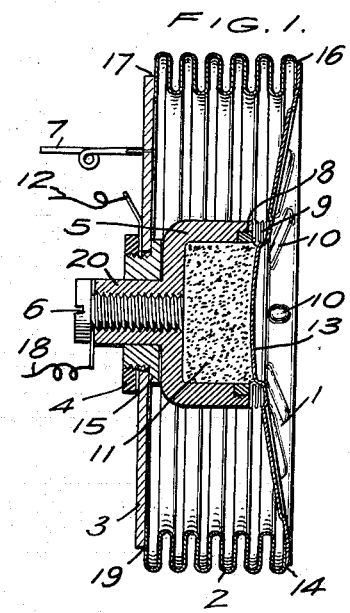
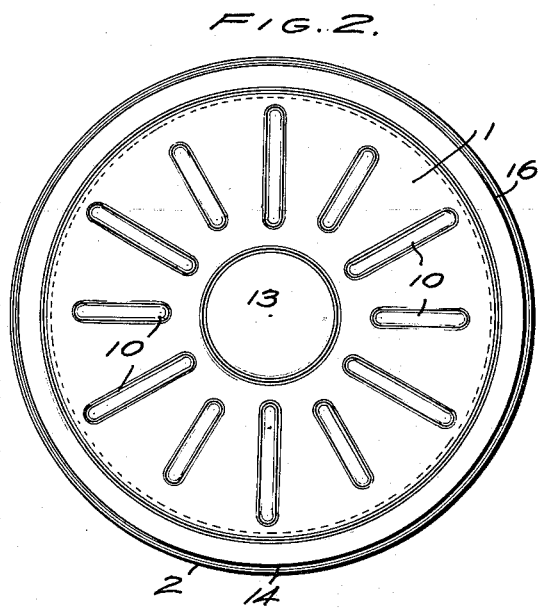
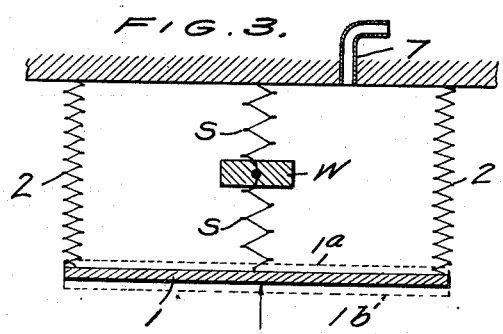
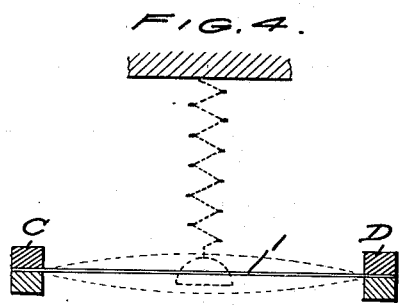
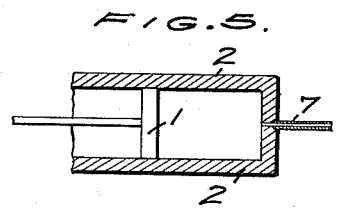
INVENTOR
GEORGE A. GRAHAM
BY Francis H. Vandenhoeck
Charles A. Rowe
ATTORNEYS Feb. 2, 1937.         G. A. GRAHAM         2,069,242
ELECTROACOUSTIC ENERGY CONVERTING SYSTEM
Filed Jan. 19, 1933       3 Sheets-Sheet 2

INVENTOR
GEORGE A. GRAHAM
BY Francis H. Vanderwerker
Charles A. Rowe
ATTORNEYS

Feb. 2, 1937.  G. A. GRAHAM  2,069,242
ELECTROACOUSTIC ENERGY CONVERTING SYSTEM
Filed Jan. 19, 1933  3 Sheets-Sheet 3
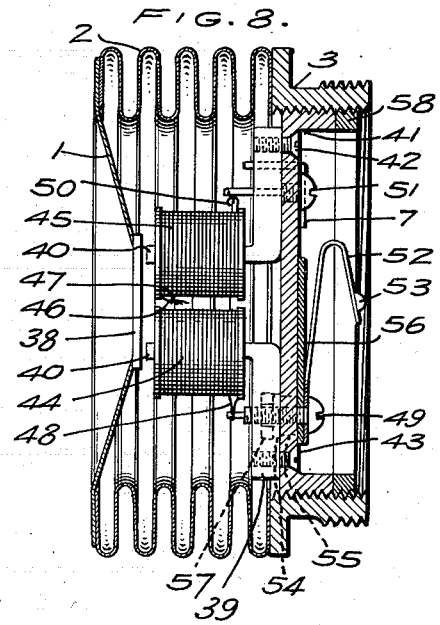
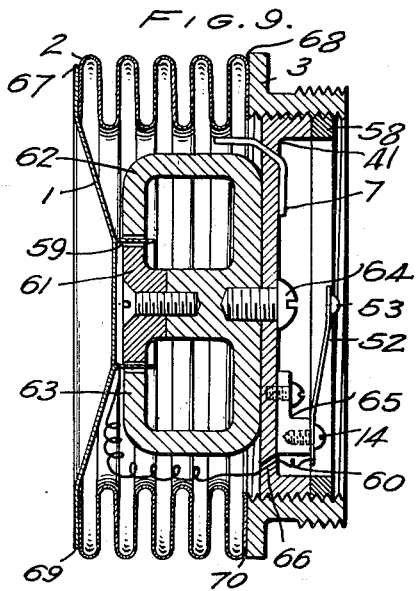
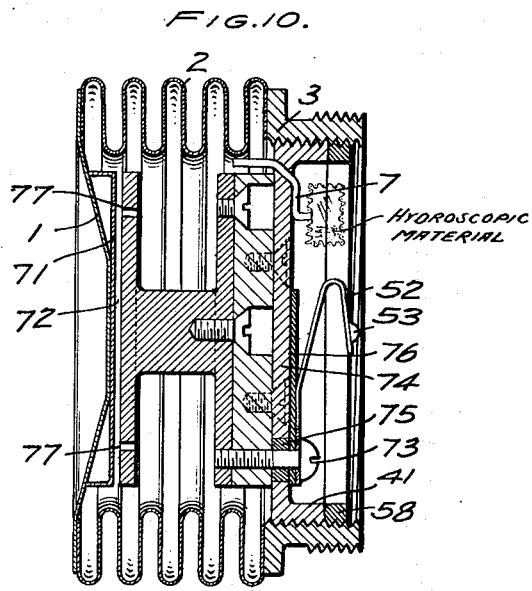
INVENTOR
GEORGE A. GRAHAM
BY Francis H. Vanderveer
Charles A. Rowe
ATTORNEYS

UNITED STATES PATENT OFFICE 2,069,242

ELECTROACOUSTIC ENERGY CONVERTING SYSTEM

George A. Graham, Fort Monmouth, Oceanport, N. J.

Application January 19, 1933, Serial No. 652,510

5 Claims. (Cl. 179—101)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electro-acoustic energy converting systems. The invention proposes an improvement in vibrating systems employed for the conversion of acoustical energy into electrical energy and also for the conversion of electrical energy into acoustical energy.

One of the main objects of this invention is to provide a vibratory system of true piston or plunger action for all devices or embodiments falling within the scope of the invention.

Another main object of this invention is to provide a vibratory system in which the vibratory element or its equivalent will operate with true piston action, which action in conjunction with certain restoring and damping factors is superior in principle, in application, in faithfulness of reproduction, and in efficiency, to existing vibratory systems.

Existing commercial telephone transmitters, or more broadly speaking, microphones used for the conversion of acoustical energy into electrical energy, may be classified under certain general principles of operation, that is, variable resistance (granular carbon types), magnetic (moving coil or moving armature), variable capacitance, and to a very limited extent thermionic (hot wire microphones). The reproducers (receivers, loud speakers, and the like) used for the conversion of electrical energy into acoustical energy may likewise be classified as magnetic, capacitive, and also to a very limited extent thermionic. All of these principles of operation of the microphones and the reproducers, with the exception of the thermionic, require as a medium in the conversion act the introduction of a mechanical vibratory system. In the thermionic type an air column is the vibrating system. The mechanical vibratory systems usually consist of diaphragms, which are clamped about their peripheries.

In the microphones, this diaphragm is impulsed by the sound waves acting upon it and in turn this diaphragm movement is made to vary the resistance of an electrical circuit, and hence varies the current; or in the magnetic type to induce a current in a circuit; or in the capacitive type to vary the capacitance of a circuit. In the reproducers, the diaphragm is the sound source and is impulsed or driven by the various electrical principles of attraction and repulsion.

In the theory of elastic vibrations, there are two kinds of diaphragms; namely, membranes and plates. A membrane is assumed to admit of being both bent and stretched by the action of small distorting forces, acting perpendicular to its plane. It tends to return to its normal undisturbed position under the action of antiflexural restoring forces across its plane, and antistretching restoring forces in its plane. A plate is assumed to admit of being bent, but not stretched, by the action of small distorting forces. It tends to return to its normal undisturbed position solely under the action of antiflexural restoring forces across its plane. In practice, a diaphragm may behave mainly as a plate, but also partly as a membrane, the degree of mixture depending on its specific elasticity, its dimensions, and on the nature of the clamping. In the case of the diaphragm of a telephone receiver, or the diaphragm of a telephone transmitter, clamped at the edge in the ordinary way, without stretch, the diaphragm may be considered as a plate. In certain microphones, diaphragms under stretch are frequently used and such diaphragms must be considered as mixtures of plates and membranes. In either case such diaphragms may vibrate in three modes, and either singly or in any combination of these modes:

(1) As a whole, and without nodal diameters or nodal circles.

(2) In circular sectors with nodal diameters.

(3) In circular segments with nodal circles.

Also in most existing vibrating systems the acoustical properties and proportions of the vibratory system are incidental and subservient to many other design considerations and other features of the microphone or reproducer and hence is not necessarily an ideal arrangement from the acoustical standpoint.

An ideal diaphragm should faithfully follow every variation of the impressed sound waves, or of the impressed vibromotive force as applied by means of an alternating magnetomotive force in the magnetic circuit of a permanent magnet, without the introduction of any other characteristics, such as resonance peaks or harmonics peculiar to the diaphragm itself. That is, the vibratory system should be nearly aperiodic through the working frequency band and perform as a true piston either as a driven agent or as a driving agent. This invention has these primary objects in mind and is predicated upon the design of an improved vibratory system, which more nearly approaches and satisfies the ideal conditions than any existing type from all standpoints, acoustical, electrical, and mechanical.

Also in most existing vibratory systems, using the clamped diaphragm method, the degree of pressure exerted by the clamping members is of primary importance. This clamping pressure should be uniformly exerted about the periphery of the diaphragm if all devices of a given production are to render uniform response. Such, however, is rarely the case because usually the clamping member clamps the diaphragm at sections and hence each and every diaphragm performs in a manner characterized by the particular clamping. Another main object of this invention is to provide a vibratory system which is not clamped about its periphery as is usual to diaphragm types, and therefore eliminates the variable element of degree of clamping. In other words, this vibratory system has so called "free edge" characteristics.

Another main object of this invention is to provide a construction for telephone transmitters and receivers, loud speakers, and such devices which embodies a moisture proof inclosure for important elements and particularly the active hygroscopic elements.

A serious objection to existing telephone handset transmitter design lies in the fact that the granular carbon inclosure (which inclosure may in ordinary commercial practice take the form of an impregnated bag or sack) is not moisture proof. Considerable moisture is present in the breath of all persons who use such handsets and in time such unprotected transmitters are rendered useless by accumulation of moisture in the granular carbon inclosure. Also in tropical use the extreme humidity of the atmosphere alone is sufficient to render unprotected transmitters useless in a relatively short period of time due to the fact that moisture penetrates the granular carbon inclosure. Practices such as inserting a dental rubber membrane within the transmitter and between the diaphragm and the exterior air may be considered as makeshifts, a certain amount of acoustical energy is absorbed, and an overall loss in efficiency results.

Also the practice of attaching the granular carbon inclosure or bag integrally to the diaphragm, and moisture proofing that inclosure alone is not to be recommended, because the very vital condition of actually compressing or releasing the granules upon movement of the diaphragm is lost and the device simply acts to agitate the granules without any variation in pressure. Accordingly, it will be seen that the resistance variation of such a device is limited.

In contradistinction to the practices cited, this invention provides a construction for telephone hand set transmiters which permits of the transmitter unit being completely submerged in water without any subsequent impairment of transmitter efficiency. These same constructional advantages apply to such embodiments as receivers, loud speakers, and the like inasmuch as coil windings and corrosive working surfaces are entirely inclosed and hence may be thoroughly moisture proofed, without any loss in efficiency.

Other objects will appear as the description proceeds:

In the drawings:

Fig. 1 is a sectional view showing the vibratory system as applied to a microphone, or telephone transmitter;

Fig. 2 is an end view of this same embodiment;

Fig. 3 is a schematic drawing showing the mechanics of a vibratory system in accordance with the invention:

Fig. 4 is a schematic drawing showing the mechanics of conventional vibratory systems;

Fig. 5 is a schematic drawing showing the piston analogue of the invention;

Fig. 8 is a sectional view showing the vibratory system as applied to a telephone receiver or loud speaker of the permanent magnet, moving armature type;

Fig. 9 is a sectional view showing the vibratory system as applied to a telephone receiver or loud speaker of the permanent magnet, moving coil type; and Fig. 10 is a sectional view showing the vibratory system as applied to a condenser microphone, condenser receiver, or condenser loud speaker.

Figure 6:
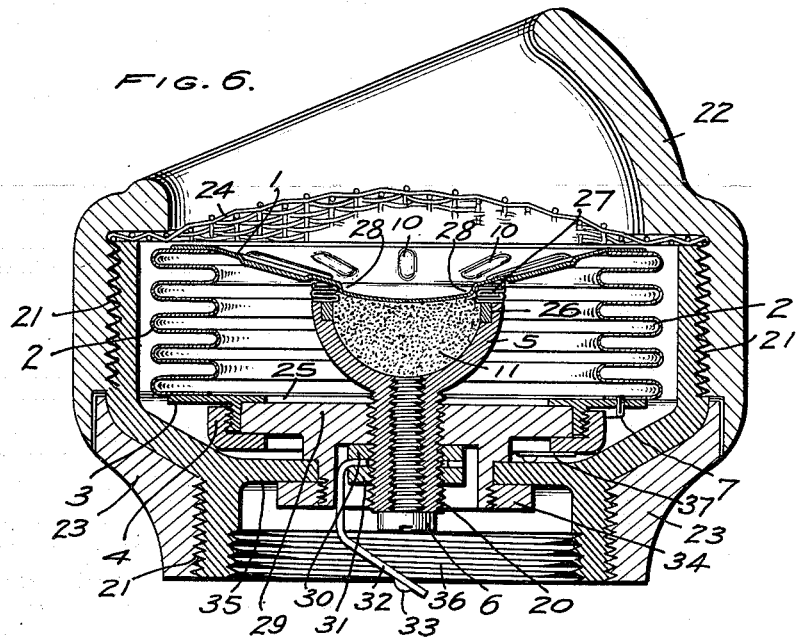
Fig. 6 is a sectional view showing the vibratory system and the specific constructional features in their application to a telephone handset transmitter.

With reference to Fig. 1, the numeral 1 designates the member which is to be driven by acoustical impulses. This member may not be properly referred to as a diaphragm in the sense that the word is used in communication parlance, but will be referred to herein as the vibratory element, or driven member or surface, or driving member or surface, as the case may be. The driven member 1 as here shown takes the form of a truncated cone and preferably is made of aluminum, aluminum alloy, or any other proper metal for the purpose, but it should be very light and therefore a thickness of metal between .003 and .006 of an inch has been found efficient. This member is reinforced in sections in some suitable arrangement as shown by the introduction of ribs or flutes, or may also be reinforced by circular sections formed in the metal. The intention here is to so reinforce the driven member 1 as to prevent or to reduce to a minimum any tendency of the driven member toward bending or stretching within its own diameter, and also to prevent vibration in circular sectors with nodal diameters or in circular segments with nodal circles. Therefore, the particular form is incidental so long as the primary requirement of rigidity is attained. Under these circumstances such a driven member, under acoustical impulses and with proper restoring forces, will tend not only to move backward or forward as a unit but to remain in a plane parallel to its undisturbed position. Now in order that this uniform movement may be obtained the flexing features must be external to the driven member 1; therefore, such a rigid driven member 1, is attached to a flexing cylinder 2, which may be flexed, accordion fashion, between said driven member and rigid plate 3. It should be stated that the flexing cylinder is also made preferably of aluminum of aluminum alloy, but may be made of other metals. The gauge however in any case should be light and from about .003 of an inch to .006 of an inch has been found suitable. The flexing cylinder 2, is circular in any section perpendicular to its axis, and is in turn fastened to a rigid circular plate 3, which may be of any proper metal but of substantial dimensions and well reinforced. The joints between the driven member 1 and the flexing cylinder 2 are shown as at 14 and 16, and also the joints between the flexing cylinder 2 and the rigid circular plate 3, shown as at 17 and 19, are made in such a manner as to provide fluid-tight connection, also to provide electrical contact between the three members. Now it will be noted in the embodiment of Fig. 1 that the rigid driven member 1, flexing cylinder 2, and rigid mounting plate 3, are coordinated with a granular carbon inclosure 5. The granular carbon inclosure may be of any convenient shape or design, but for reasons of simplicity an arbitrary form is shown. The numeral 9 designates a flexible washer of impregnated felt, cotton, or corrugated paper in washer form, which permits of relatively free movement of the driven member 1, and yet retains the carbon granules 11 within the inclosure 5. An insulating disc 8 is inserted between the carbon granules and the inclosure 5 as shown. Screw 6, or a similar arrangement, serves conveniently as a plug to permit of filling the carbon inclosure 5 with the carbon granules 11, after other parts of the structure are assembled. The numeral 15 designates an insulating bushing, sealed to the stud 20 of the inclosure 5, and 4 is a nut used to lock the plate 3 to the inclosure assembly. The unit so described is sealed at the rear so as to be air tight. Now there are three considerations for such a unit; one wherein the unit is made air tight at atmospheric pressure; another wherein the interior of the unit is evacuated to a value below atmospheric pressure, or that the air inside the unit is compressed to a value above atmospheric pressure; and a third wherein a tube provides for an equalization between the interior and exterior air to equalize variations in barometric pressure, and also to provide a certain acoustical resistance and damping. This description will be confined to the equalizing tube consideration which in Fig. 1 is shown in the form of a flexible tube or duct as at 7, although it is desired to point out the other possibilities of this construction inasmuch as they may be very desirable for certain classes of work, such for instance as hydrophones, and the like. It is also desired to point out that hydrophones (under water microphones) may employ this vibratory system with or without the tube. Without the tube, it is obvious that the instrument could readily be made water tight. In using the tube, in under water instruments, precautions identical with those observed in diving bell practice would be necessary. The internal diameter of the tube is small compared to its length. Wires 12 and 18 are used for battery supply in the conventional manner. Upon connecting battery or other source of potential to wires 12 and 18, the circuit is completed through the rear mounting plate 3, flexible member 2, driven member 1 and surface 14, carbon granules 11, granule inclosure 5, and wire 18. Movement of the driven member 1 serves to compress the carbon granules against each other, or to remove that pressure and allow the granules to adjust themselves in accordance with their weight and formation. As is well known to the art, this variation of pressure upon the granules varies the electrical conductivity through the granules and hence varies the current through the electrical circuit. The auxiliary devices required to transmit this electrical energy over distances and to again convert it into acoustical energy need not be described here.

The principal concern herein is to describe the advantages of this vibratory system over other types, likewise to emphasize the moisture proofing qualities of the construction. For purposes of comparison, reference is made to Figs. 3 and 4. Fig. 3 illustrates the mechanics of my vibratory system and Fig. 4 the mechanics of the conventional type. In the conventional type (Fig. 4) the diaphragm 1 is clamped about its periphery as at C and D. In the simplest analysis such a diaphragm vibrates under applied forces, with an amplitude which depends on the diaphragm's stiffness and mass. At low frequencies stiffness is the controlling factor but at high frequencies, mass has the greater influence. At some intermediate frequency, known as the resonance frequency, a balance exists between stiffness and the mass, or inertia effect, and a relatively large amplitude of vibration results. At low frequencies where stiffness predominates, the velocity is proportional to frequency while at the higher frequencies, with inertia controlling, the velocity varies inversely as frequency. To make the velocity independent of frequency, resistance must be added in sufficient amount to make it the controlling element. Assuming air as the medium, the resistance here referred to is air resistance. In the conventional vibratory system no provision is made for such control except incidental and accidental areas of housings and similar parts. In certain types of instruments this feature of air damping has been considered in conjunction with the diaphragm by providing a definite outlet to the housing under the diaphragm. However, there are many disadvantages and variables which make the clamped diaphragm arrangement anything but ideal.

With reference to Fig. 4, it will be noted that the displacement of the diaphragm 1, varies from zero at the clamping circle C and D to a maximum at or near the center of the diaphragm; so that there is a distribution of vibration amplitude over the surface, and also a corresponding distribution of elastic restoring forces over the same area. This presents a complicated dynamic system very difficult to analyze. However, the resulting action is anything other than simple piston action under impulsing and restoring forces, because the diaphragm may, as stated previously, vibrate in any one or combinations of three modes, and hence superimpose any of these characteristics with the result that the final performance of the diaphragm is the resultant of the impressed forces and the diaphragm characteristics, rather than a faithful reproduction of the impressed forces. Again variations in the degree of clamping of the diaphragm about its periphery has a signal influence on the resonant frequency of the diaphragm, and if clamped unevenly, on the introduction of nodal segments or circles, and hence on the response in general. Practically every person has noticed these effects in the "tinny or scratchy" sound produced by certain receivers or loud speakers under given conditions. Now in this invention the effort has been to produce true piston action under impulsing forces with the restoring forces always of a definite value.

With reference to Fig. 3, the driven member may be represented by the uniformly distributed vibratory element or mass 1 executing a vibratory amplitude 1a—1b, under the influence of the impressed forces below, and the elastic restoring forces of the springs 2—2. The air column within the cylinder may be represented by the spring S and the damping factor of the air inlet by the weight W. It will be seen that when a small acoustical force is impressed upon the driven member 1, the small vibratory displacement thereby produced is entirely in the first mode, that is, as a whole and without nodal diameters or nodal circles, so that the equivalent mass executes a simple harmonic displacement of the same frequency as the impressed force, and of a small amplitude. This amplitude is of the same value throughout the surface of 1. The elastic restoring force is contained in the sides of the flexible cylinder represented by springs 2—2 and in the air column represented by spring S, inasmuch as at voice frequencies or higher frequencies, elastic potential energy is stored in the air column and delivered back to the driven member 1 upon a rarefaction. Such a construction possesses also what might be termed "push-pull" characteristics, inasmuch as a compression pulse in the atmosphere being of higher instantaneous pressure than the normal atmosphere within the cylinder causes a movement of the driven member 1 in one direction; a rarefaction pulse in the atmosphere being of lower instantaneous pressure than the normal atmosphere within the cylinder, causes a movement of the driven member 1 in the opposite direction. It should be realized that the air movement through the equalizer tube is relatively slow and hence acts as a constant resistance to movement of the air column and hence of the driven member 1 and also applies constant damping to that movement. The resistance to movement is frictional mechanical resistance and air resistance, that is, the resistance of springs 2—2, and the resistance of the air within the cylinder to being compressed or rarefied. The air resistance may be regulated to a nicety by properly choosing the dimensions of the air inlet tube or duct 7. The entirely inclosed cylinder, except for the air inlet tube, may be considered as a resonator and would therefore possess a certain fundamental frequency determined by the volume of the resonator and the area and length of the inlet aperture. As a resonator, this cylinder may be made aperiodic over the frequencies at which the instrument is to be worked, by the proper selection of the inlet aperture dimensions.

The action of the driven member 1 is comparable to the action of the piston 1 of Fig. 5. The sides of the cylinder 2—2 introduce frictional resistance to the piston movement in the same way as the sides of the flexing cylinder 2—2, Fig. 3, introduce stiffness resistance. The effect of the air column and air outlet is identical in Figs. 3 and 5. In brief, however, it will be seen that the principles exemplified by this invention are a more satisfactory answer than any existing type, to the definition of an ideal vibratory system, which is, that an ideal vibratory system, considered as the driven agent of acoustical forces, would have all its mechanical resistance of the acoustic type and none of the frictional type. It will also be seen that these same principles may be applied to various types of microphones, receivers, loud speakers, and similar devices.

It is believed that the vibratory system has been sufficiently described to warrant a description of its specific application to a telephone handset transmitter and to discuss certain physical advantages of such a construction from the standpoint of interchangeability of units and moisture proofing features.

Figure 7:
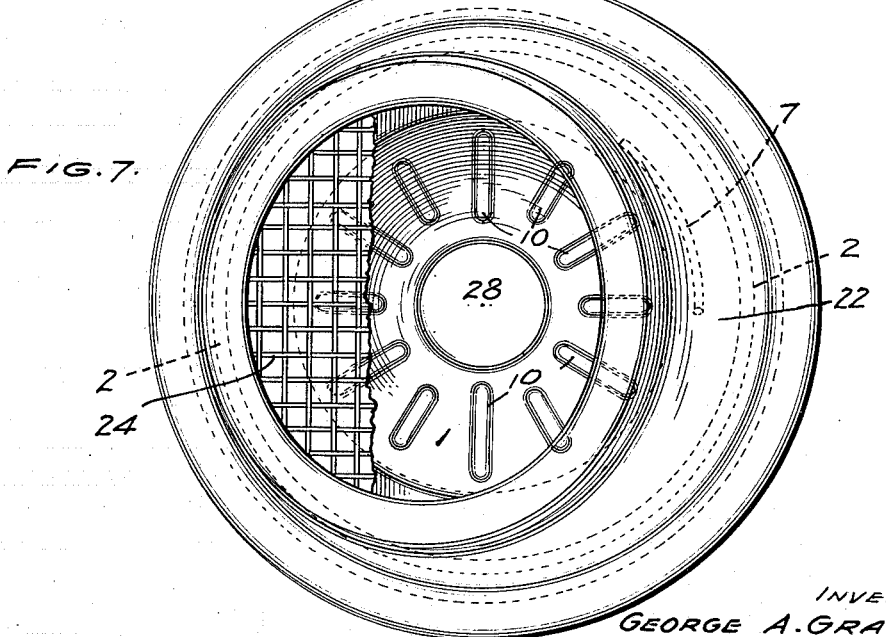
Fig. 7 is an end view of the same embodiment.

Referring to Fig. 6, the numeral 21 designates the transmitter case or housnig by means of which the other details are housed or supported. This case 21 is of metal, preferably aluminum alloy by reason of the low specific gravity of that metal. The transmitter mouthpiece and cap is shown at 22 and is of bakelite, or any other suitable moulded insulating material. The form shown is arbitrary. A sleeve of moulded insulating material 23 is provided to harmonize with the exterior. A wire screen of suitable gauge for the purpose of protecting the transmitter interior against mechanical injury is shown as at 24. Obviously free air movement is permitted through this screen. An auxiliary screen of impregnated gauze may also be installed under the wire screen 24 to prevent dust and insects from entering the interior but this feature is entirely optional and has no bearing on the invention. Now within the inclosure so described there is installed the transmitter unit proper consisting of the vibratory system claimed by me in conjunction with other constructional transmitter details. The driven member 1 which preferably is made of a light gauge metal, such as aluminum, aluminum alloy, or any suitable metal protected by a non-corrosive finish, is of truncated cone section, and is reinforced by proper ribs or flutes as at 10 to prevent bending or stretching across its diameter. The structure should be such that this member 1 may be moved or vibrated as a whole and not in sections, and also that in any position of vibration all sections of the member are parallel with the plane of the initial position. The driven member 1 is brazed, soldered, or otherwise secured to the flexing cylinder 2 in order to provide a fluid-tight joint, and is in electrical contact therewith. These two details may be formed as an integral structure where feasible. The flexing cylinder 2 is also of metal, preferably aluminum, or aluminum alloy, properly treated against oxidation. Bronze may be used if desired, but in any event the gauge of the metal should be very light preferably about .003 of an inch. The objection may be raised by the uninitiated that such cylinders with the deep peripheral convolutions are difficult of manufacture, but such is not the case. In the experimental models of this particular transmitter sections of sylphon cells such as are provided in certain barographs were utilized and proved to be ideal for the purpose. Such sylphon cells are procurable in a variety of sizes and gauges from manufacturers of meteorological instruments. The depth of the convolutions should be relatively as great when compared to the other dimensions as shown in graphical form in Fig. 6. The flexing cylinder 2 is brazed, soldered, or otherwise joined to provide a fluid tight joint, and in electrical contact, with the mounting plate 3. The mounting plate 3 provides an internal circular aperture 25 to facilitate the assembly of the granular carbon inclosure details. The granular carbon inclosure is shown by 5 and it will be noted that one conventional form or shape is shown. The choice of a proper shape for this inclosure is outside the scope of this invention and therefore a desirable arbitrary shape has been shown. The carbon inclosure 5 is provided with an insulating bushing 26, and is seated on an insulating flexible washer 27, which may be of impregnated cotton, felt or paper properly collapsed, accordion fashion, to provide a resilient washer which retains the carbon granules at the juncture between the carbon inclosure 5 and the driven member 1. The carbon granules are represented by 11. The screw plug 6 provides a convenient method of filling the inclosure with the granular carbon after assembly of the transmitter unit. The area shown at 28 on the driven member 1 is also of convenience in the assembly of the unit. The rear insulating bushing 29, in conjunction with plate 3 and ring lock nut 4 serves to support the carbon inclosure stud 20. The carbon inclosure stud 20 is also locked in position by nuts 30 and 31, between which nuts there is located an electrical terminal detail 32 which is provided with a contact at 33. Nut 34 serves in turn to lock the entire transmitter assembly into the housing 21 at section 35. The inlet tube, to provide for equalization of barometric pressure between the outer and interior air and also to provide the proper acoustical resistance and damping, is shown as at 7. A very convenient form for this tube has been found to be circular as the segment of an arc of desired length and attached to the plate 3. This form is indicated by the dotted lines 7 in Fig. 7. Threads 36 in housing 21 provide a means for attaching the complete transmitter assembly to the handle of the telephone handset proper which is not shown in these drawings. Suffice it to say that electrical connections of the handset handle are presented at contact 33 and the metallic transmitter housing 21. Continuing the circuit from housing 21, a path is provided by contact 37, integral with ring nut 4 to plate 3, in turn to flexing member 2, to driven member 1, to carbon granules 11 at properly treated surface 28, and through these carbon granules 11 to inclosure 5, and hence to contact 33 by way of stud 20 and nuts 30 and 31 through contact spring 32. Considered merely from an electrical standpoint, the device operates in the conventional manner.

It will be noted that the transmitter is so formed that the essential details hereinbefore described constitute a single unit readily replaceable in housing 21. This unit is by definition and by construction entirely moisture proof, or may very readily be made so by the introduction of any gaskets or seals required, with the exception of the inlet through the tube 7. Upon immersion of the transmitter unit in water, the air within the cylinder will prevent water from entering through the tube. From the standpoint of humid conditions in tropical countries the inclosure will also be moisture proof for long periods of time, but can be made entirely so by the addition of a hydrating chamber at the end of the tube filled with proper chemicals or glass wool.

It is believed proper to describe the experience gained in the assembly of the transmitter unit inasmuch as certain features are involved which facilitate the operation and govern in degree the subsequent operating efficiency. Consider the detail parts 1, 2, 3, 6 and 7 as being located with drive element 1 down on a template the contour of which coincides with the contour of element 1 to prevent subsequent injury. The flexible washer 27 is now inserted through aperture 25 and properly seated about the surface 28 which by its configuration provides a centering seat for the washer. The bushing 29 and carbon enclosure 5 are now assembled and said enclosure 5 inserted through aperture 25 until in contact with washer 27, but in such a manner that the bushing 29 does not engage with plate 3. At this point a definite pressure is exerted downward on stud 20 and adjusted by gauge to an exact value in, let us say, grams. The pressure is held at this value and the bushing 29 is screwed down stud 20 until engagement with plate 3 is attained. Ring nut 4 is now locked in position, and lock nut 30 installed or screwed down as the case may be. The pressure on the stud 20 may now be removed and the inclosure 11 filled with carbon granules, after which the screw 6 is inserted, contact spring 32 installed, and nut 31 run in position. The unit then may be given any precautionary seals desired and inserted into the housing 21 in which it is clamped by nut 34. The reason for describing the above technique is that it is important that the initial adjustment between the driven member 1, the flexible washer 27, and the inclosure 5, be of that value determined experimentally to afford the most uniform and satisfactory overall results.

The principles of operation of this application of the vibratory system to the telephone handset transmitter, Fig. 5, are substantially as described above for Fig. 1.

The application of this vibratory system to the specific construction of a telephone handset receiver is shown in Fig. 8. The same construction, or a modified construction, is equally applicable to telephone receivers in general, or to loud speakers, of the permanent magnet, moving armature type.

Referring to Fig. 8, the vibratory system consists of a driving member 1, armature 38, flexing member 2 attached to mounting plate 3 and comprises the air chamber within the cylinder, and the air column in tube 7. The driving member, so called in this case because it is the acoustic driver acting under vibromotive forces applied through alternating magnetomotive force in the magnetic circuit of a permanent magnet acting on a light armature, is of truncated cone section, properly ribbed or fluted to prevent bending or stretching across or through its diameter. The particular form of reinforcement is optional so long as the driving member 1 vibrates as a whole and not in sections. Therefore, many alternative forms of reinforcement, or means of providing rigidity to the driver 1 as a whole, will occur to the reader. However, the cone shape is preferable inasmuch as the cavity so formed makes a more efficient acoustical driver. For our purposes here, the driver 1 should preferably be formed of thin gauge aluminum, or aluminum alloy, but in any event should be of non-magnetic material. The armature 38 is of a grade and gauge of iron or other magnetic material proper for the purpose and is protected by some finish or process against oxidation. The armature is fastened to the driver 1, in such a manner as to maintain the enclosure fluid tight. The flexing cylinder 2 is of a suitable material such as aluminum, aluminum alloy, or bronze, of light gauge, and of characteristics such that following the application of a certain flexing force in a direction parallel to the axis of the flexing cylinder that the antiflexing forces thereby built up, shall be relatively high and increase in value with the flexing. The connection between the flexing cylinder 2 and the driver 1, about their peripheries, is such as to provide an air tight joint, but not necessarily in electrical contact inasmuch as these members have no part in the electrical circuit. The connection between the flexing member 2 and the rigid mounting plate 3, is also such as to provide a fluid tight joint.

The magnetic system is the usual arrangement for bipolar permanent magnet receivers or reproducers in which the horseshoe permanent magnet 39 is so formed or jointed as to present poles at 40 of opposite polarity. The permanent magnet is mounted on the aluminum or brass mounting plate 41 by means of screws 42 and 43. The magnetic circuit is then through the horseshoe magnet 39 to one of the poles, thence across the air gap to armature 38 and through the armature and the opposite air gap to the other pole 40. As is well known in the art, the part played by the permanent magnet in a telephone receiver of this type is very important and not only synchronizes the attractive vibromotive force on the armature, with the alternating current through the receiver windings, but it also greatly enhances the magnitude of the vibromotive force.

The coil windings by means of which the magnetic field is varied are shown as at 44 and 45, properly positioned about the poles of the permanent magnet. These coils are so connected in series by wires 46 and 47 that any direct current component subsequently impressed on the receiver and poled correctly will tend to aid the residual magnetism of the permanent magnet. The series connection of the coils is then continued by wire 48 to terminal screw 49 and by wire 50 to terminal screw 51. Terminal screw 51 provides a path to the aluminum or brass mounting plate 41 and hence to the aluminum or brass member 3. Terminal screw 49 provides a path to contact spring 52 and contact 53, 54 being an insulating washer, 55 an insulating bushing, and 56 an insulating strip.

A feature of this receiver construction lies in the fact that it facilitates assembly in accordance with quantity production methods. Consider detail parts 1, 38, 2 and 3 as having been assembled in one unit, and details 40, 44, 45, 39, 41, 42, 43, air tube 7, details 51, 56, 52, 53, 49, 48, 50, 46, 47, 55, 54, and nut 57 as another unit and all wiring connections properly made. Also that surfaces 38 and 40 have previously been ground true and perpendicular to the receiver axis. For the sake of simplicity, the first unit will be referred to as the vibrating system and the second unit as the magnetic system. The magnetic system is screwed as a unit into the vibrating system to an approximate position. Certain tests are then conducted as a basis for adjustment of parts and to permit calibration of active elements in order to secure maximum response at desired operating frequencies. The ring lock nut 58 is then run into position, locking the vibrating system and the magnetic system in the relationship determined most satisfactory in the adjustment process. This method of adjustment assures a uniform product for a large number of receivers and is considered to be a particular feature of this construction and preferable to existing methods of adjusting to a gauged air gap dimension without any particular compensation for variation in the response characteristics of the product.

The electrical characteristics of the permanent magnet, moving armature type of instrument is sufficiently well known not to warrant a detailed description here. Suffice it to say that such an instrument receives alternating electrical power from the circuit with which it is connected and transforms this into magnetic power in the magnetic circuit of the instrument. This alternating magnetic power is again transformed into alternating mechanical power, for the production of acoustical vibrations.

From the standpoint of the new vibratory system the very desirable true piston action is obtained which introduces the ideal conditions as described above for transmitters. The fluid chamber within the receiver in conjunction with the tube 7 compensates for the mass, or inertia, of the flexing member 2 at high frequencies. Assuming air as the fluid in said chamber, if the air tube were closed, the air in the chamber would be compressed and rarefied as the driver 1 moved back and forth during a cycle. The air chamber would then act as a spring and so add to the stiffness of the flexing member and to a certain extent offset the mass of the driver. With the tube open at high frequencies, this action takes place because the time period of one cycle is so small that the time is insufficient for but a very small quantity of air to flow back and forth through the tube. This stiffness added at high frequencies, by counteracting the inertia effect, tends to produce a velocity that is independent of frequency. These considerations are also of vital importance in the moving coil receiver next to be described.

The application of this vibratory system to the specific construction of a moving coil microphone is shown in Fig. 9. The construction is similar to the previous constructions described in detail and therefore it is considered adequate to confine this specific description to the salient features.

Referring to Fig. 9, the moving coil 59 wound in cylindrical form of aluminum wire, is attached by varnish or similar suitable material to the non-magnetic rigid driven member 1. One end of this coil is attached to the driven member 1 and the other end to wire 60 and hence to contact spring 52 and contact 53. The other side of the circuit is provided by the metallic portions of the structure, that is, driven member 1, flexing cylinder 2, and plate or mounting housing 3. The coil 59 is properly positioned in the permanent magnetic field of magnet 61, 62 and 63. This magnet is mounted on the non-magnetic metal plate 41, by means of screw 64. As in previous cases an air inlet tube is provided at 7. Other details are: 65 is insulation, 58 is the ring lock nut, and the hole 66 is sealed after the insulated wire 60 has been installed. The cylindrical joints at 67, 68, 69, and 70, are air or fluid tight and also provide for electrical conductivity.

The facilities of this construction for assembling and adjusting a given number of instruments to a uniformity of output are similar to those described above for the receivers, with the exception that as a microphone the driven member 1 should be coupled to an acoustic driver and the coil output measured over the frequency band desired.

As is well known to the art, movement of the coil in a plane perpendicular to the magnetic field acts to induce an electromotive force across the coil, which is proportional to the velocity of movement of the coil, the strength of the magnetic field, and the number of turns in the coil. As stated, other things being equal, the voltage is proportional to the velocity of the coil. To provide that the voltage be independent of frequency it is necessary that resistance be made the controlling element. Velocity, however, is inversely proportional to resistance, when resistance is the controlling factor, so that in order to obtain high sensitivity, or large velocity per unit force, the resistance must be kept within reasonable limits. To keep the resistance low and at the same time make it the controlling factor, requires that both the stiffness of the flexing cylinder 2 and the mass of the driven member 1 be kept as small as possible, and that by some means the stiffness at low frequencies, and the mass at high frequencies, be compensated for. The fluid chamber within the microphone in conjunction with the inlet tube 7 provides the means for compensating for the mass of the driven member 1 be kept as small as possible at high frequencies as described for the receiver above. Since the resistance decreases with frequency, it will be seen that the stiffness of the flexing cylinder 2 tends to control the motion at low frequencies, but by proper adjustment and design of tube diameter and length, these elements may be adjusted within predetermined limits.

The application of this vibratory system to the specific construction of a condenser microphone is shown in Fig. 10. The same construction, or a modified construction embodying the invention, is equally applicable to condenser loud speakers, or reproducers.

Referring to Fig. 10, the light disc 71, fastened to the driver or driven member 1, acts as the movable plate of the condenser, and the disc surface 72 acts as the stationary plate of the condenser. As is well known a variation in dialectric spacing, which in this case is air, serves to vary the capacitance between the two plates as a condenser, and this variation in capacitance may be used to action as a microphone; or in the case of a receiver, a variation in impressed charge may be made to attract or repel the plates. These two condenser plates may be connected to an external circuit by means of the metallic housing member 3 and hence to plate 71 on one side; and to contact 53, and hence to plate 72 by means of contact spring 52, screw 73, and to the metallic spool-like structure of 72, on the other side. It is obvious that plate 74, bushing 75, and strip 76 are of insulating material, and that 58 is the ring lock nut as in previous cases. The various screws are for mounting or assembly purposes. An air tube 7 is provided for connecting the chamber with the outer air. In the plate 72, air holes are provided as at 77 for the purpose of controlling the acoustical resistance and stiffness. All the acoustical advantages inherent in the invention and applicable to the other embodiments, are equally applicable to the condenser form.

I claim:

1. In an electro-acoustical energy converting system; a vibratory component, comprising an impulse responsive element; a flexing cylinder for mounting said element to permit piston-like vibration thereof and forming a fluid-tight junction therewith; a second component adapted for assembly with the first-named component, as a replaceable unit, and comprising adjustable means for supporting co-operating parts of said system; means for preliminarily coupling said components to permit adjustment and calibration of active elements at desired operating frequencies; and means to complete the coupling operation of the components in fluid-tight assembly with one another and without disturbing the adjustment.

2. In an electro-acoustical energy converting system; a vibratory component, comprising an impulse responsive element; a flexing cylinder for mounting said element to permit piston-like vibration thereof and forming a fluid-tight junction therewith; a second component adapted for assembly with the first named component as a replaceable unit, and comprising means for mounting active elements of the system in adjustable relation; means for preliminarily coupling the said components to permit calibration of said elements first to an optimum point; means to provide subsequent readjustment as to response; and means to effect final coupling of the components in fluid-tight assembly with one another and without disturbing the adjustment.

3. In a device of the character described, comprising an electro-acoustical energy converting system; a vibratory component adapted for assembly as a unitary structure, comprising an impulse responsive element; a coupling collar; a flexing cylinder for mounting said element in vibratory relation with said collar, said cylinder forming a fluid-tight junction with said collar and said element; a second structural component adapted for assembly as a unit interchangeable with similar units, and comprising means for supporting parts of said system; means for coupling said components to permit preliminary adjustment of co-operating active elements of said components; and means for coupling said components in fluid-tight assembly with one another and without disturbing said adjustment.

4. In an electro-acoustic energy converting system; a vibratory component adapted for assembly as a unitary structure, comprising an impulse responsive element; a coupling collar; a flexing cylinder for mounting said element in vibratory relation with said collar, said cylinder forming a fluid-tight junction with said element and said collar; a second component adapted for assembly as a unit interchangeable with similar units and carrying co-operating parts of said system; an enclosure for active hygroscopic material, and means for mounting said enclosure as a part of said second component; and means for coupling said components in fluid-tight assembly with one another.

5. In an acoustical instrument, a component adapted for assembly as a unitary structure, comprising a vibratory element; a coupling member; a flexing cylinder for mounting said element in vibratory relation with said member, said cylinder forming a fluid-tight junction both with the member and said element; a second component adapted for assembly with the first named component as a unit interchangeable with similar units and carrying cooperating parts of the instrument; an enclosure for active hygroscopic material; means for mounting said enclosure as a part of said second component; elastic sealing means interposed between said enclosure and the vibratory element; and means for coupling the components in fluid-tight assembly with one another.

GEORGE A. GRAHAM.